United States Patent [19]
Guest

[11] Patent Number: 5,085,472
[45] Date of Patent: Feb. 4, 1992

[54] TUBE COUPLING SLEEVES

[75] Inventor: Timothy S. Guest, Maidenhead, United Kingdom

[73] Assignee: John Guest Engineering Limited, Middlesex, United Kingdom

[21] Appl. No.: 452,226

[22] Filed: Dec. 15, 1989

[30] Foreign Application Priority Data

Dec. 16, 1988 [EP] European Pat. Off. ............ 88311936

[51] Int. Cl.$^5$ ............................................ F16L 41/08
[52] U.S. Cl. .................... 285/158; 285/308; 285/322; 285/331; 285/341
[58] Field of Search ............... 285/158, 211, 220, 322, 285/323, 331, 353, 340, 371, 341, 308; 411/525, 526, 527, 528, 529

[56] References Cited

U.S. PATENT DOCUMENTS

| | | | |
|---|---|---|---|
| 2,712,262 | 7/1955 | Knohl | 411/521 |
| 3,359,021 | 12/1967 | Wurzel et al. | 285/340 X |
| 3,923,323 | 12/1975 | Brogan | 285/341 X |
| 4,427,219 | 1/1984 | Madej | 285/331 X |
| 4,440,424 | 4/1984 | Mode | 285/340 X |
| 4,593,945 | 6/1986 | Hana et al. | 285/340 X |
| 4,630,848 | 12/1986 | Twist et al. | 285/340 X |
| 4,637,636 | 1/1987 | Guest | 285/323 X |
| 4,685,706 | 8/1987 | Kowal et al. | 285/322 |
| 4,895,395 | 1/1990 | Coriani | 285/340 X |

FOREIGN PATENT DOCUMENTS

8705087 8/1987 World Int. Prop. O. .......... 285/308

Primary Examiner—Randolph A. Reese
Assistant Examiner—Heather Chun
Attorney, Agent, or Firm—Baker & Daniels

[57] ABSTRACT

The disclosure relates to a tube coupling sleeve having a throughway open at one end to receive an end part of a tube to be coupled therein. The sleeve has an end stop spaced from the open end to define the limit of insertion of the tube in the sleeve and an inner integral hollow spigot extends along the sleeve from the end stop through the open end of the sleeve to project into the tube. The outer surface of the spigot has annular ridges or ribs to grip the inner surface of the tube and hold it in place. The closed and of the sleeve has an encircling head to fit in a bore in a body and the head has an encircling steel star washer to lock the head in the bore.

19 Claims, 9 Drawing Sheets

TUBE COUPLING SLEEVES

BACKGROUND OF THE INVENTION

1. Field of the Invention

The invention relates to coupling sleeves for tubes.

2. Description of the Prior Art

German Patent Specification No. 941399 discloses a tube coupling sleeve having a throughway open at one end to receive an end part of a tube with an end stop in the throughway for the tube, the sleeve having tube gripping means to hold the tube in the sleeve. The sleeve has coupling means to enable the sleeve to be attached to a further component. The arrangement does not however permit the sleeve to be readily engaged and held in a simple bore in a body member.

SUMMARY OF THE INVENTION

The invention provides a tube coupling sleeve having a throughway open at one end to receive an end part of a tube, and an end stop in the throughway for the tube, spaced from said one open and through which an end part of a tube is inserted, the sleeve having releasable tube gripping means to hold the tube end part therein and detent means around the outer surface of the sleeve to permit insertion of the sleeve in a bore in a body member and to resist extraction of the sleeve from the bore whereby the sleeve may be assembled in a bore in a body member with a tube coupled thereto.

Preferably wherein at least a portion of the throughway in the sleeve comprises a bore of similar diameter to the external diameter of the tube to be inserted in the sleeve to receive the tube in a close fitting relationship.

The end stop in the throughway may comprise an annular abutment encircling the throughway at a location spaced from said open end to define the limit of insertion of the tube in the throughway.

In the latter case wherein a hollow spigot may extend from the inner side of the annular abutment along the throughway to engage in the tube to be inserted in the sleeve.

More particularly the hollow spigot may project outwardly of the sleeve through said open end.

Furthermore the outer surface of the spigot may be formed with spaced ribs or projections to grip the inner surface of the tube to hold the tube on the spigot and thereby in the sleeve.

In any of the above arrangements a releasable locking device may be mounted in the sleeve to engage the outer surface of the tube end part inserted in the sleeve and thereby hold the tube in the sleeve.

For example the releasable locking device may comprise a tapered cam surface in the sleeve reducing in diameter towards the open end of the sleeve and a collet located in the open end of the sleeve having resilient arms engagable with the tapered cam surface to be compressed thereby against a tube extending into the sleeve to grip and hold the tube in the sleeve.

In the latter case a collet release member may be mounted in the sleeve providing an annular ramp surface with which the collet arms are engageable on depressing the collet into the sleeve to spread the arms and thereby release a tube.

In a further arrangement the releasable locking device for holding the tube in the sleeve may comprise a grab ring mounted in the open and of the sleeve to engage an outer surface of the tube inserted in the sleeve and aranged to allow insertion of the tube in the sleeve but to resist withdrawl of the tube from the sleeve. In the arrangement an axial slidable collar may be mounted in the end part of the sleeve to project from the sleeve and is engagable with the grab ring to deflect the grab ring out of engagement with the outer surface of a tube extending through the sleeve and thereby permit withdrawal of the tube from the sleeve.

In a still further arrangement the releasable tube locking device may comprise a compression ring mounted in the sleeve adjacent the open and thereof and means mounted in the open end of the sleeve to apply pressure to the compression ring to force the compression ring radially inwardly into gripping engagement with the tube inserted in the sleeve.

The means for applying pressure to the compression ring may comprise a collar screwed into the open end of the sleeve and engagable with the compression ring.

In any of the above arrangements the throughway in the sleeve may have a recess disposed between said open and said end stop in which one or more sealing rings are mounted for sealing engagement with the outer surface of a tube to be inserted in the sleeve.

Also in any of the above arrangements the detent means around the outer surface of the sleeve may comprise a washer mounted on the outer surface of the sleeve and having a plurality of outwardly extending resilient fingers inclined towards the open end of the sleeve to bear against an inner surface of a bore in a body in which the sleeve is to be inserted.

BRIEF DESCRIPTION OF THE DRAWINGS

The following is a description of several specific embodiments of the invention, reference being made to the accompanying drawings in which.

DESCRIPTION OF THE PREFERRED EMBODIMENTS

Figure 1:
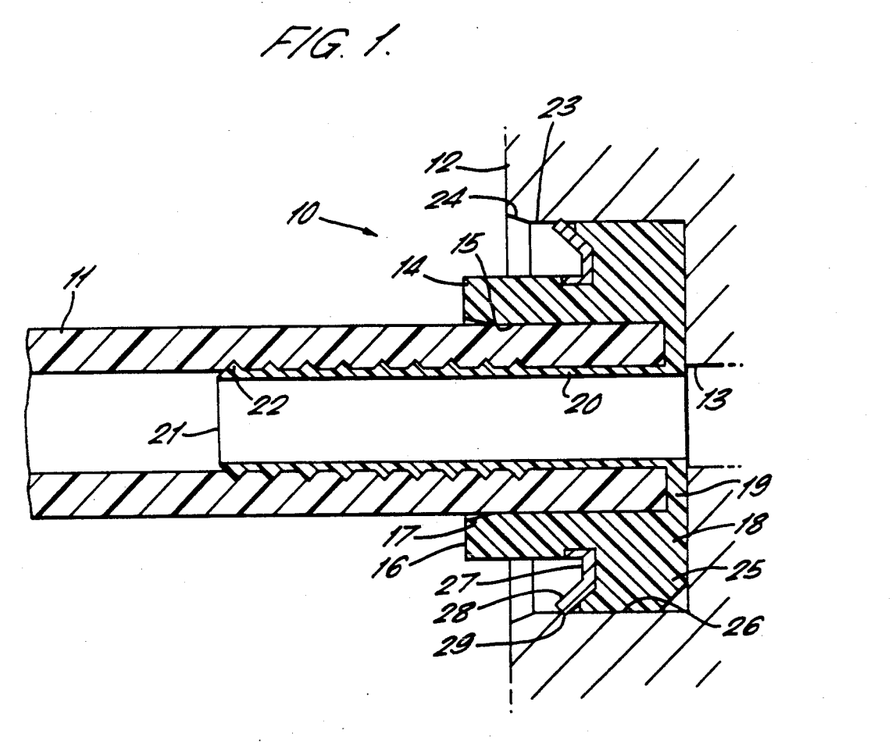
FIG. 1 is a sectional view through a tube coupling sleeve in accordance with the invention with a tube engaged therein and the sleeve locked in a bore in a body member.

Referring firstly to FIG. 1 of the drawings, there is shown a tube coupling sleeve indicated generally at 10 for coupling a tube 11 to a body 12 having a throughway 13 to communicate with the tube.

The tube coupling sleeve is a one piece plastics moulding comprising a main outer sleeve 14 having a bore 15 corresponding in diameter to the outer diameter of the tube 11. The bore 15 is open at one end 16 of the sleeve and the part of the bore 15 adjacent end 16 of the sleeve has a counter bore 17 to guide an end of a tube 11 into the bore. At the opposite end 18 of the sleeve, the bore 15 closed by an annular end wall 19 encircling the bore and having an inner sleeve 20 projecting from the inner periphery of the annular end wall concentrically through the bore 15 and out of said one end of the outer sleeve 14 to terminate in an end 20 spaced from the end 16 of the outer sleeve. The outer diameter of the inner sleeve 20 is of a comparable diameter to the inner diameter of the tube 11 so that the tube is a close fit between the inner wall of the outer sleeve 14 and the outer wall of the inner sleeve 20. The annular end wall 19 forms an end for limiting insertion of the tube 11 into the coupling sleeve.

The inner sleeve 20 is formed with a series of ridges 22 around the outer surface of the sleeve at spaced locations along the sleeve to form a gripping engagement with the inner surface of the tube 11 to assist in retaining the end part of the tube 11 in the coupling sleeve.

The body 12 to which the coupling sleeve is to be connected has, as indicated above, a throughway 13 for communication with the tube 11 and the throughway has an enlarged parallel sided counter bore 23. The mouth of the counter-bore is itself formed with a shallow divergent counter bore 24. The outer coupling sleeve 14 is formed with an enlarged head 25 adjacent the end 18 of the sleeve which has a cylindrical outer surface 26 which is a close or interference fit in the counter bore 23.

An annular stainless steel star washer 27 is moulded into the sleeve 14 and head 25 and is formed with a plurality of resilient fingers 28 which are angled away from the end 18 of the sleeve. The fingers 28 have outer corners 29 which project beyond the periphery 26 of the head to be compressed inwardly by engagement of the head in the counter bore to provide a positive gripping action with the counter bore and thereby to prevent extraction of the coupling sleeve from the counter bore.

The arrangement thus provides a simple and convenient arrangement in which a tube coupling sleeve can be engaged over an end part of a tube 11 and the coupling sleeve readily located in the counter bore 23 in the body 12.

Figure 2:
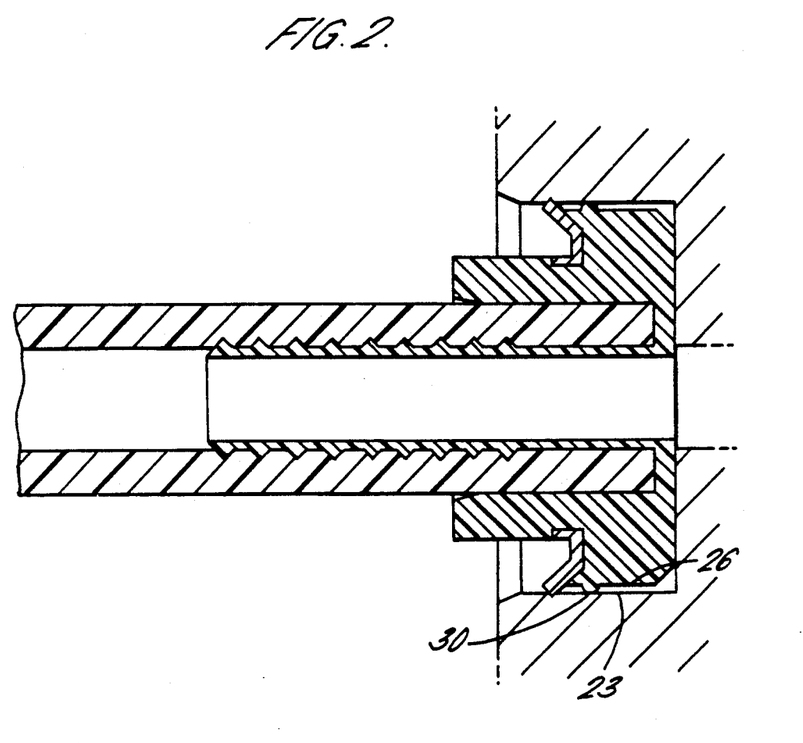
FIG. 2 shows a similar arrangement to that of FIG. 1 with one form of a seal on the sleeve for engaging the bore in the body member.

FIG. 2 of the drawings shows a similar arrangement to that of FIG. 1 except the outer diameter 26 of the head 25 is formed to provide a slight clearance with the counter bore 23 and the head is formed with an integral annular pip 30 spaced between the star washer 27 and end 18 of the head to seal with the surface of the counter bore 23.

Figure 3:
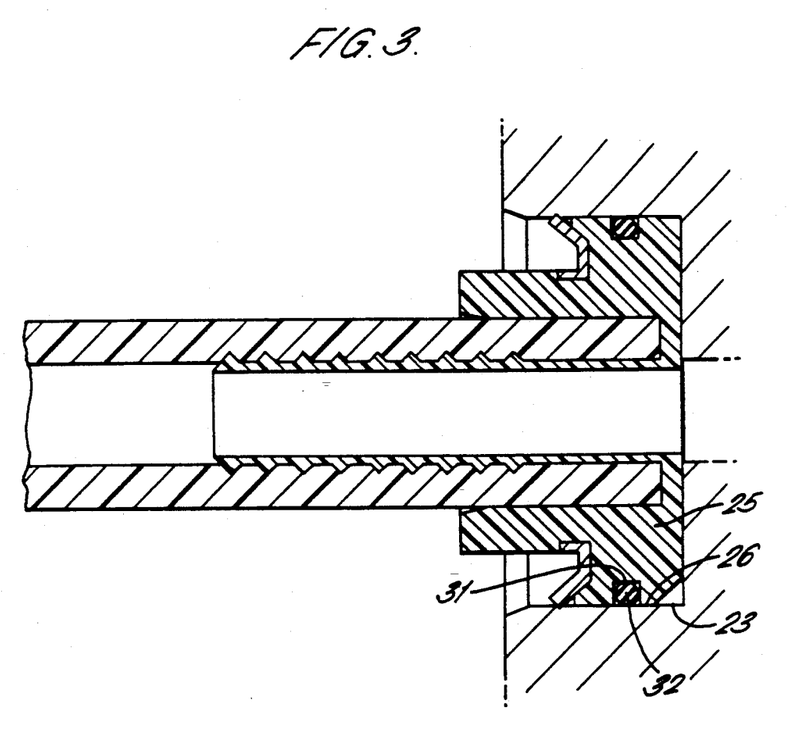
FIG. 3 is a similar view to FIG. 2 showing a further form of seal.

FIG. 3 shows an alternative sealing arrangement to that of FIG. 2 in which the outer surface 26 of the head 25 is an inter-clearance fit in the counter bore 23 and a channel 31 is formed around the outer surface of the head in which an O-ring seal 32 is engaged to seal with the counter bore 23.

Figure 4:
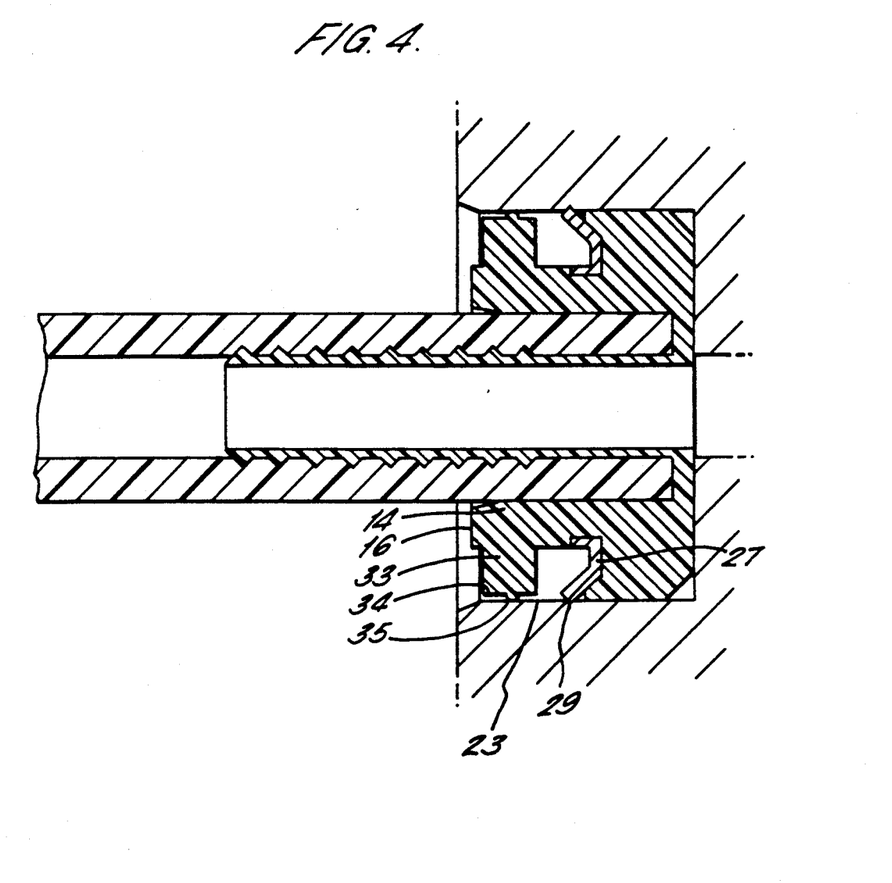
FIG. 4 shows similar arrangement to that of FIG. 2 with a further seal arrangement.

FIG. 4 shows yet a further arrangement which is similar to that of FIG. 1 except that sleeve 14 has an encircling flange 33 formed adjacent the end 16 of the sleeve and the encircling flange 33 which is spaced along the sleeve from the star washer 27. The flange 33 has an outer cylindrical surface 34 which is dimensioned to be closely spaced from the counter bore 23 and has an encircling integral annular pip 35 to seal with the counter bore.

Figure 5:
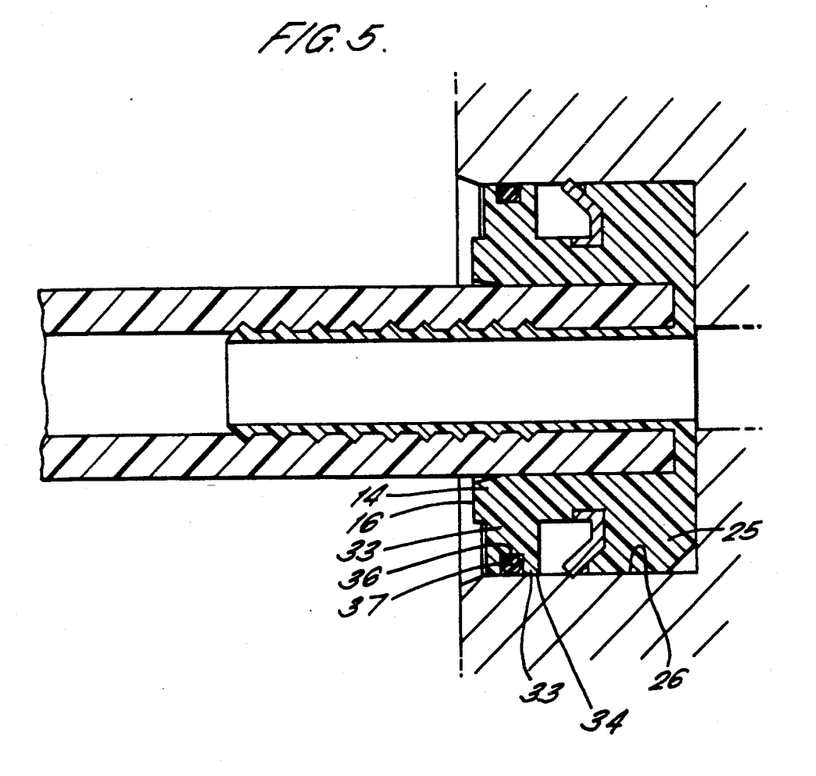
FIG. 5 is a view of a similar arrangement of that of FIG. 2 with yet a further seal arrangement.

FIG. 5 of the drawing shows a modification of the arrangement in FIG. 4 in which the outer cylindrical surface 34 of the additional head 33 is dimensioned to be a close or interference fit in the counter bore 26 and an annular channel 36 is formed around the outer surface of the head 33 in which an O-ring seal 37 is mounted to seal with the counter bore 26.

Figure 6:
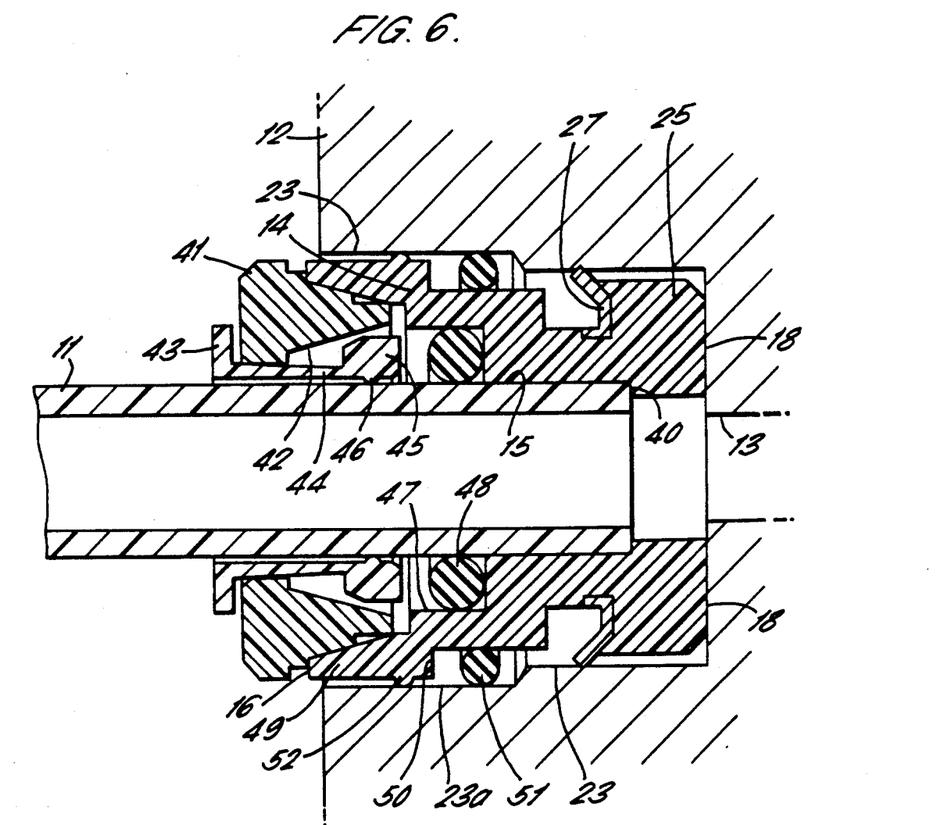
FIG. 6 shows a further tube coupling sleeve in which the tube is held in the sleeve by a releasable collet.

Referring now to FIG. 6 of the drawings, there is shown a rather different form of tube coupling sleeve embodying the invention. In this case the bore 15 to receive the tube 11 terminates adjacent the end 18 of the sleeve in an annular shoulder 40 to limit insertion of the tube 11 through the sleeve.

Instead of holding the tube 11 in the sleeve by means of an inner sleeve 20 as in the FIG. 1 arrangement, the tube is held in the sleeve by means of a collet arrangement of the construction described and illustrated in our U.K. Pat. No. 1,520,742 disposed in the open and 16 of the sleeve. More particularly, the open end 16 of the sleeve has a moulded plastics insert 41 mounted therein formed with a tapering internal cam surface 42 which reduces towards the open end of the insert. A collet 43 having resilient fingers 44 is located in the insert with the fingers projecting through the insert and terminating in enlarged heads 45 which have ridges or barbs 46 on their inner sides to engage the tube 11. The outer sides of the heads 45 are engageable with the tapered cam surface 42 by drawing the collet in the direction out of the insert and thereby to be forced into gripping engagement with the tube 11 to lock the tube in the sleeve 14.

Between the insert 41 and the reduced diameter bore 15 of the sleeve 14, there is a counter bore 47 in which a O-ring 48 is mounted to seal with the outer surface of the tube 11.

The sleeve 14 has a head 25 at the end 18 as in the FIG. 1 arrangement and a star washer 27 is moulded between the sleeve and head to grip the counter bore 23 in the body 12 as before. However, in this case, the counter bore 23 has a further counter bore 23a towards the open end of the throughway and the outer surface of the sleeve 14 has an enlarged end portion 49 in which the insert 41 is mounted and which provides an annular shoulder 50 encircling the sleeve and facing into the counter bore in the body towards the end 18 of the sleeve. A O-ring seal 51 is engaged between the sleeve 14 and further counter bore 49 being held therein by the shoulder 50.

The outer surface of the enlarged end portion 49 of the sleeve has an encircling annular pip 52 formed integrally therewith to seal with the further counter bore 23a to provide a secondary seal to the O-ring seal 51.

Figure 7:
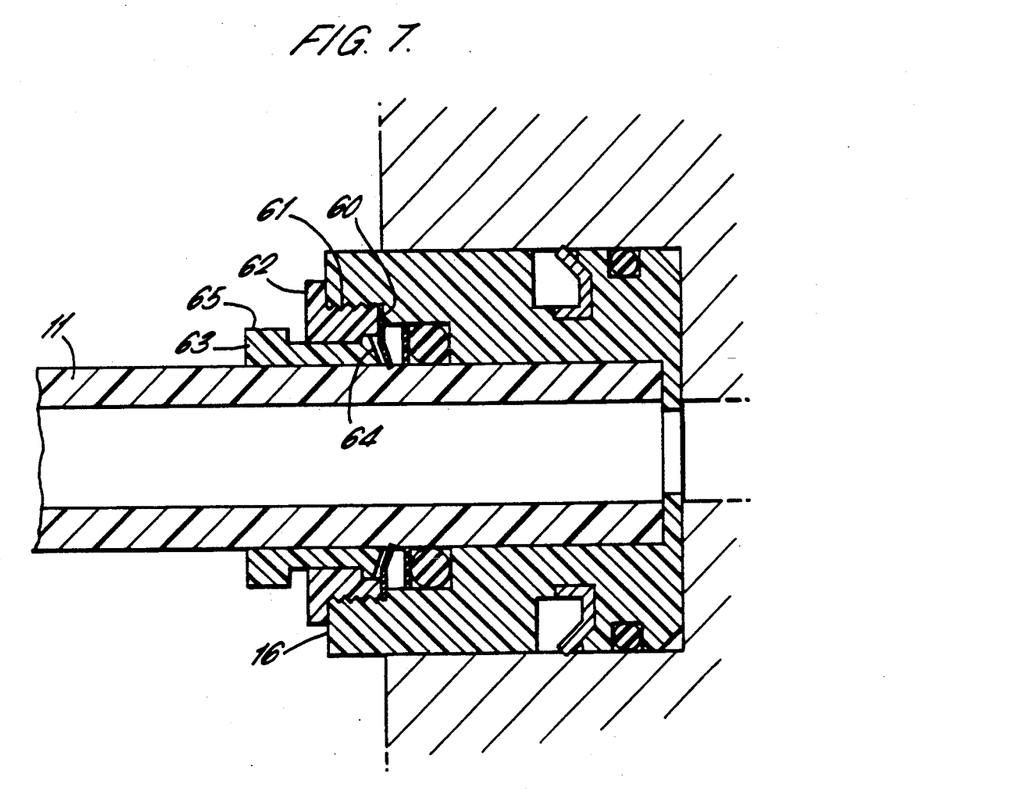
FIG. 7 shows a further tube coupling sleeve in which the tube is held in the sleeve by a releasable grab ring.

FIG. 7 of the drawings shows a further modified arrangement in which like parts have been allotted the same reference numerals and in which the tube 11 is held in the sleeve 14 by means of an annular grab ring 60 trapped in a counter bore 61 in the open end 16 of the sleeve by a collar 62 locked in the sleeve. The inner periphery of the grab ring is formed with angled resilient teeth to grip the outer surface of the tube 11 to lock the tube in the sleeve. A release sleeve 63 is slidably mounted in the collar 62 and having an inner end 64 for engaging the resilient fingers of the grab ring to deflect the fingers out of engagement with the tube when the release sleeve is depressed into the collar. The end of the release sleeve projecting from the collar 62 formed with an enlarged head 65 to faciliate depression of the sleeve.

Figure 8:
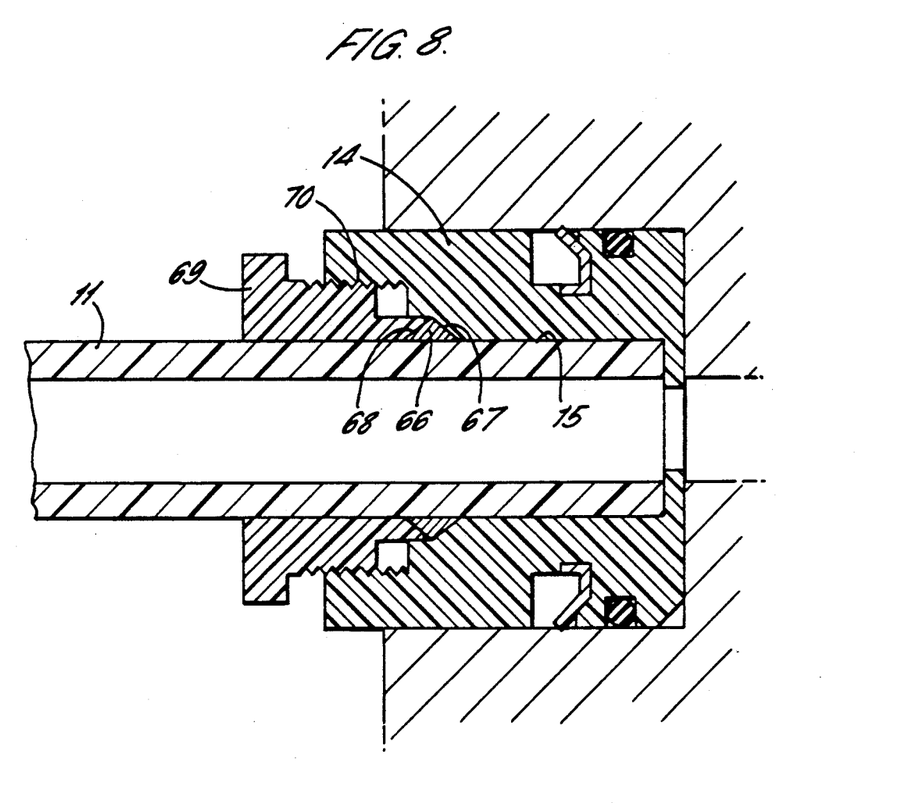
FIG. 8 shows a further tube coupling sleeve in which the tube is held in a sleeve by a compression fitting.

FIG. 8 shows a further arrangement in which the tube 11 is locked in the sleeve 14 by means of an "olive" or compression ring 66 trapped between an inclined face 67 encircling the wall 15 in the sleeve and a similar inclined face 68 formed on a collar 69 screwed into a counter bore 70 in the open end of the sleeve. Tightening the collar into the sleeve compresses the compression ring 66 against the tube 11 thereby locking the tube in the sleeve.

Figure 9:
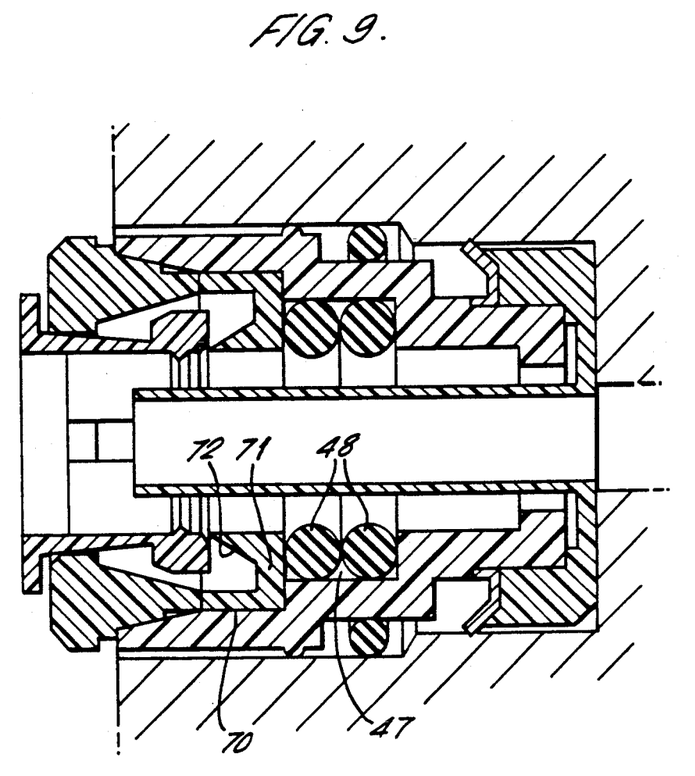
FIG. 9 shows a further sleeve arrangement in which the tube is held in the sleeve by a releasable collet for which a release ring is provided and seals are provided within the sleeve for sealing engagement with the tube.

FIG. 9 of the drawing shows an arrangement generally similar to that of FIG. 6 except that twin o-ring seals 48 are mounted side by side in the counter bore 47 in the sleeve 14 and a further counter bore 70 is formed next to the counter bore 47 in which a release ring 71 for the collet arms is mounted. The release ring has an annular ramp 72 projecting towards the heads of the collet and depressing the collet into the insert causes the heads to engage the ramp 72 and lift away from the tube engaged by the heads to allow the tube to be extracted from the sleeve.

I claim:

1. A tube coupling sleeve for coupling a tube to a body member, said sleeve comprising: a throughway with one end thereof adapted to receive an end part of a tube; releasable gripping means in said throughway for receiving and holding the end part of the tube in the throughway; detent means mounted on an outer surface of the sleeve for permitting insertion of the sleeve into a bore in a body member and for resisting extraction of the sleeve from the bore; an encircling annular shoulder on said sleeve outer surface, said shoulder facing towards said one end of said sleeve; said detent means comprising an annular ring mounted in engagement with said annular shoulder, said ring having a plurality of resilient fingers around its outer periphery which project outwardly beyond said annular shoulder and which are angled towards said one end of said sleeve, said annular shoulder supporting said angled resilient fingers, whereby said plurality of resilient fingers can readily flex inwardly to allow the sleeve to be inserted into said bore in said body member but are restrained from outward flexing to resist withdrawal of the sleeve from the bore.

2. A tube coupling sleeve as claimed in claim 1, wherein at least a portion of the throughway in the sleeve comprise a bore of similar diameter to the external diameter of the tube to be inserted in the sleeve to receive the tube in a close fitting relationship.

3. A tube coupling sleeve as claimed in claim 1, wherein the throughway has an annular abutment encircling the throughway at a location spaced from said open end to define a limit of insertion for the tube into the throughway.

4. A tube coupling sleeve as claimed in claim 3, wherein a hollow spigot extends from the inner side of the annular abutment along the throughway to engage in the tube to be inserted in the sleeve.

5. A tube coupling as claimed in claim 4, wherein the hollow spigot projects outwardly of the sleeve through said open end.

6. A tube coupling sleeve as claimed in claim 5, wherein the outer surface of the spigot is formed with spaced ribs or projections to grip the inner surface of the tube to hold the tube on the spigot and thereby in the sleeve.

7. A tube coupling as claimed in claim 1, wherein a releasable locking means is mounted in the sleeve for engaging the outer surface of the tube end part inserted in the sleeve and for holding the tube in the sleeve.

8. A tube coupling sleeve as claimed in claim 7, wherein the releasable locking device comprises a tapered cam surface in the sleeve reducing in diameter towards the open end of the sleeve and a collet located in the open end of the sleeve having resilient arms engagable with the tapered cam surface to be compressed thereby against a tube extending into the sleeve to grip and hold the tube in the sleeve.

9. A tube coupling sleeve as claimed in claim 7, wherein the releasable locking device for holding the tube in the sleeve comprises a grab ring mounted in the open end of the sleeve to engage an outer surface of the tube inserted in the sleeve and arranged to allow insertion of the tube into the sleeve but to resist withdrawn of the tube from the sleeve.

10. A tube coupling sleeve as claimed in claim 10, wherein an axial slidable collar is mounted in the end part of the sleeve to project from the sleeve and is engageable with the grab ring to deflect the grab ring out of engagement with the outer surface of a tube extending through the sleeve and thereby permit withdrawal of the tube from the sleeve.

11. A tube coupling as claimed in claim 7, wherein the releasable tube locking device comprises a compression ring mounted in the sleeve adjacent the open and thereof and means mounted in the open end of the sleeve for applying pressure to the compression ring to force the compression ring radially inwardly into gripping engagement with the tube inserted into the sleeve.

12. A tube coupling as claimed in claim 11, wherein the means for applying pressure to the compression ring comprises a collar screwed into the open end of the sleeve and engagement with the compression ring.

13. A tube coupling sleeve as claimed in claim 1, wherein the throughway in the sleeve has a recess disposed between said open end and said end stop, in which one ore more sealing rings are mounted for sealing engagement with the outer surface of a tube to be inserted into the sleeve.

14. A tube coupling sleeve as claimed in claim 1, wherein the detent means around the outer surface of the sleeve comprises a washer mounted on the outer surface of the sleeve and having a plurality of outwardly extending resilient fingers inclined towards the open end of the sleeve to bear against an inner surface of a bore in a body in which the sleeve is to be inserted.

15. A tube coupling sleeve as claimed in claim 1, wherein the sleeve has a recess in its outer surface in which a resilient seal is mounted for sealing engagement with the outer surface of a bore in a body in which the sleeve is to be inserted.

16. A tube coupling sleeve as claimed in claim 1, wherein the sleeve has an encircling rib to engage the bore of a body in which the tube is to be inserted.

17. A tube coupling sleeve as claimed in claim 1, wherein the sleeve is formed as a plastic molding and the annular ring is formed from steel and is molded into the sleeve.

18. A tube coupling sleeve for coupling a tube to a body member, said sleeve comprising: a throughway with one end thereof adapted to receive an end part of a tube; releasable gripping means in said throughway for receiving and holding the end part of the tube in the throughway; detent means mounted on an outer surface of the sleeve for permitting insertion of the sleeve into a bore in a body member and for resisting extraction of the sleeve from the bore; an encircling annular shoulder on said sleeve outer surface, said shoulder facing towards said one end of said sleeve; said detent means comprising an annular ring mounted in engagement with said annular shoulder; releasable locking means mounted in the sleeve for engaging the outer surface of the tube end part inserted in the sleeve and for holding the tube in the sleeve, said releasable locking means including a tapered cam surface in the sleeve reducing in diameter towards the open end of the sleeve having resilient arms engageable with a tapered cam surface to be compressed thereby against the tube extending into the sleeve to grip and hold the tube in the sleeve; a collet release member mounted in the sleeve providing an annular ramp surface with which the collet arms are engageable on depressing the collet into the sleeve to spread the arms and thereby release a tube; said ring having a plurality of resilient fingers around its outer periphery which project outwardly beyond said annular shoulder and which are angled towards said one end of said sleeve, whereby said plurality of resilient fingers can readily flex inwardly to allow the sleeve to be inserted into said bore in said body member but will resist withdrawal of the sleeve from the bore.

19. A tube coupling sleeve for coupling a tube to a body member, said sleeve comprising: a throughway with one end thereof adapted to receive an end part of a tube; releasable gripping means in said throughway for receiving and holding the end part of the tube in the throughway; detent means mounted on an outer surface of the sleeve for permitting insertion of the sleeve into a bore in a body member and for resisting extraction of the sleeve from the bore; said sleeve having an end wall abutting said bore; an encircling annular shoulder on said sleeve outer surface, said shoulder facing towards said one end of said sleeve; said detent means comprising an annular ring mounted in engagement with said annular shoulder and the sleeve having an encircling recess formed therein, one side of the recess facing towards an open end of the sleeve that faces away from said end wall providing said annular shoulder with which the annular ring engages; said ring having a plurality of resilient fingers around its outer periphery which project outwardly beyond said annular shoulder and which are angled towards said one end of said sleeve, whereby said plurality of resilient fingers can readily flex inwardly to allow the sleeve to be inserted into said bore in said body member but will resist withdrawal of the sleeve from the bore.

* * * * *